Nov. 29, 1932.  C. R. AARESTAD  1,889,010
COW TAIL HOLDER
Filed Jan. 9, 1931
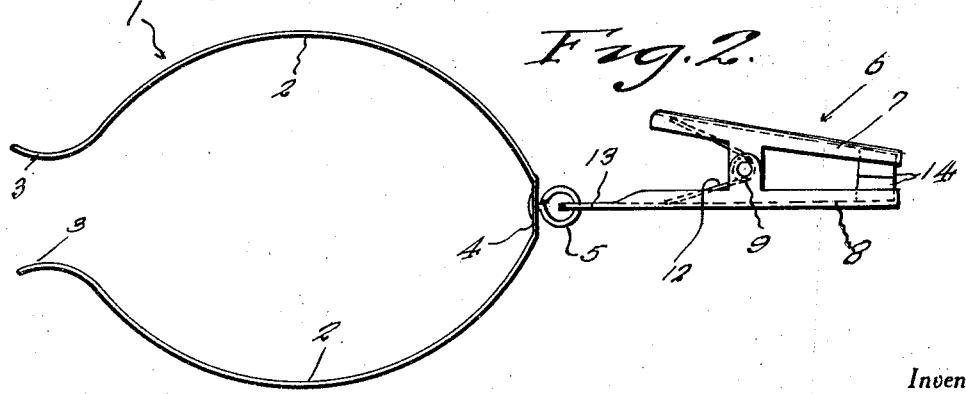
Inventor
C. R. Aarestad
By Clarence A. O'Brien
Attorney Patented Nov. 29, 1932

1,889,010

UNITED STATES PATENT OFFICE

CASPER R. AARESTAD, OF COOPERSTOWN, NORTH DAKOTA

COW-TAIL HOLDER

Application filed January 9, 1931. Serial No. 507,696.

This invention relates to new and useful improvements in cow tail holders and has for its primary object to provide, in a manner as hereinafter set forth, a device of this character embodying a novel construction and arrangement of parts whereby the tail of the animal will be securely retained against switching during the milking operation, thus eliminating annoyance to the milker and preventing dirt and other foreign matter from being thrown into the milk bucket from this cause.

Another important object of the invention is to provide a cow tail holder which is adapted to be mounted on the leg of the milker and which may remain thereon when going from one cow to the next.

Other objects of the invention are to provide a cow tail holder of the character set forth which will be simple in construction, strong, durable, efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view showing a cow tail holder in accordance with this invention in use.

Figure 2 is a top plan view of the device.

Referring to the drawing in detail, it will be seen that the reference numeral 1 designates generally a resilient clamp formed of a single piece of metal and having the free end portions of the arms 2 thereof reversely curved, as at 3 to facilitate mounting the clamp on the leg of a milker at a point just below the knee, in the manner illustrated in Figure 1 of the drawing.

The clamp 1 is provided with a flat, straight intermediate or bight portion 4 to which is swivelly connected an eye 5 which constitutes means for loosely connecting a tail clamp designated generally by the reference numeral 6 to the leg clamp 1.

The tail clamp 6 comprises a pair of opposed, coacting jaws 7 and 8 which are pivotally connected together at intermediate portions by integral, apertured ears through which the pivot pin 9 extends. A spring 12 is coiled on the pivot pin 9 and has its end portions operatively engaged with the rear end portions of the jaws 7 and 8 in a manner to yieldingly urge said jaws toward each other at their forward ends. The jaw 8 is provided with an integral, apertured extension 13 through which the eye 5 passes. Resilient gripping pads 14 of any suitable material, preferably rubber, are mounted in the clamping end portions of the jaws 7 and 8.

In use the clamp 1 is mounted on the leg of the milker just below the knee in an obvious manner in which position the clamp 6 may be conveniently engaged with the brush or end portion of the cow's tail. It will thus be seen that the tail will be securely held during the milking operation and after the milking operation it is only necessary to release the clamp 6 while the clamp 1 may be left in position.

It is believed that the many advantages of a cow tail holder in accordance with this invention will be readily understood, and, although the preferred embodiment of the invention is as illustrated and described, it is to be understood that changes in the details of construction may be had which will fall within the scope of the invention as claimed.

What is claimed is:—

1. A cow tail holder of the character described comprising a resilient, metallic clamp for detachably mounting on the leg of a milker and including a pair of coacting, resilient arms, a flat, straight intermediate portion connecting the arms at one end, the free end portions of the arms being reversely curved, an eye swivelly mounted on the intermediate portion of the clamp, and a tail engaging clamp loosely connected to the eye and comprising a pair of spring actuated jaws and resilient pads disposed on the jaws.

2. A cow tail holder of the character described comprising a substantially C-shaped resilient clamp for detachable mounting on the leg of a person, the free end portions of the clamp being reversely curved, said clamp having a straight, flat intermediate portion, an eye swivelly connected to said intermediate portion, and a tail engaging clamp loosely connected to the eye and including a pair of pivotally connected, spring actuated, coacting jaws, resilient pads mounted on the jaws for abutting engagement with each other in a manner to clamp the tail therebetween, and an integral extension on one of the jaws having an aperture therein for the passage of the eye.

In testimony whereof I affix my signature.

CASPER R. AARESTAD.